United States Patent
Lin (10) Patent No.: US 6,738,851 B2
(45) Date of Patent: May 18, 2004

(54) HOT SWAP SAFEGUARD CIRCUIT OF ULTRA DMA HARD DISK

(75) Inventor: Qi Lin, Fremont, CA (US)

(73) Assignee: HighPoint Technologies, Inc., Fremont, CA (US)

( * ) Notice: Subject to any disclaimer, the term of this patent is extended or adjusted under 35 U.S.C. 154(b) by 512 days.

(21) Appl. No.: 09/865,005

(22) Filed: May 23, 2001

(65) Prior Publication Data

US 2003/0097507 A1 May 22, 2003

(51) Int. Cl.$^7$ .............................................. G06F 13/00
(52) U.S. Cl. ...................................................... 710/302
(58) Field of Search ............................... 710/38, 2, 74, 710/10, 302, 301, 300; 711/100; 713/300; 714/5

(56) References Cited

U.S. PATENT DOCUMENTS

| | | | | |
|---|---|---|---|---|
| 5,729,763 A | * | 3/1998 | Leshem | 710/38 |
| 6,003,068 A | * | 12/1999 | Sopko | 709/205 |
| 6,178,520 B1 | * | 1/2001 | DeKoning et al. | 714/5 |
| 6,370,604 B1 | * | 4/2002 | Sreekanti | 710/302 |
| 6,446,148 B1 | * | 9/2002 | Goodfellow | 710/2 |
| 6,460,099 B1 | * | 10/2002 | Stryker et al. | 710/74 |
| 6,574,680 B1 | * | 6/2003 | Tangvald et al. | 710/10 |
| 2002/0174296 A1 | * | 11/2002 | Ulrich et al. | 711/114 |

FOREIGN PATENT DOCUMENTS

| | | | | |
|---|---|---|---|---|
| TW | 346562 A | * | 12/1998 | G06F/1/00 |
| WO | WO 97/07458 | * | 2/1997 | G06F/11/10 |

OTHER PUBLICATIONS

"Serial ATA—A Comparison with Ultra ATA Technology"; WWW, downloaded on Dec. 15, 2003.*

* cited by examiner

Primary Examiner—Xuan M. Thai
(74) Attorney, Agent, or Firm—Pacific Law Group LLP (57) ABSTRACT

A hot swap circuit board and associated cable and connector arrangement for an ATA100 computer-disk drive interface is disclosed. The hot swap circuit board comprises a key-switched power supply control circuit with a simultaneously key-operated mechanical lock, a logic control circuit for READ and WRITE control signals and a set of logic switchable bi-directional impedance circuits with signal regeneration for the control and data signals across the ATA100 Interface. During normal operation, a security lock on the hot swap circuit board is kept in its locked position thus preventing any accidental disconnection of the ATA100 interface connector while simultaneously supplying electrical power and transmitted and regenerated control and data signals across the ATA100 interface. The unlocking mechanism is also disclosed.

15 Claims, 12 Drawing Sheets

Fig. 3A  Ultra DMA: READ Timing Diagram

Fig. 3B  Ultra DMA: WRITE Timing Diagram

HOT SWAP SAFEGUARD CIRCUIT OF ULTRA DMA HARD DISK

FIELD OF THE INVENTION

This invention is related to, although not limited to, the computer-disk drive interface. More specifically, the invention is related to an electronic hardware for the hot swapping of individual disk drives or disk arrays from a microcomputer.

BACKGROUND OF THE INVENTION

With the rapid development of micro-computers and associated peripherals of higher performance at ever decreasing cost, operating systems with ever increasing functionality and reliability, numerous application software for easy creation of multi-media, content rich information and the explosive advancement of the Internet infrastructure for information delivery and sharing, micro-computer users now routinely demand that their hard disk drives sustain a tremendous data transfer rate while storing voluminous data. For example, one of the latest industry standard definitions of the computer-disk drive Interface, or I/F, is called ATA100, and it specifies a data transfer rate of 100 MB/s (Megabyte/sec) through an 80 wire flat data cable. Additionally, these hard disk drives must be quickly interchangeable with data security followed by easy I/O in the course of data transfer. Since the traditional practice for disk swapping of power cycling and rebooting of the micro-computer is still quite time consuming and prone to system reliability problems, an emerging market requirement for the process of disk swapping is that the micro-computer power supply stay on throughout the process, or the so-called hot swapping of disk drive. With this technique, the hard disk drive can now be easily plugged into and pulled out of the drive rack. In other words, the hard disk drive now behaves more like a removable hard disk.

As the speed of Central Processing Unit (CPU) of the micro-computer continues to increase without bound, the corresponding data transfer rate between a single hard disk drive and the host adapter needs to be improved to maintain the system data throughput. In fact, even at the data transfer rate of 100 MB/s, it is much too slow compared to the speed of CPU and has become the data bottleneck of the computer system. A natural solution for this problem is the deployment of disk arrays working in parallel to ease this data bottleneck. Consequently, the same market requirement of hot swapping also gets applied to the disk array.

Therefore, a solution is needed to allow, with secured access, the hot swapping of individual hard disk drives and disk arrays from a micro-computer while maintaining an ATA100 data transfer rate of 100 MB/s across the computer-disk drive interface, which is an industry standard definition of the computer-disk drive interface.

SUMMARY OF THE INVENTION

The first objective of this invention is to devise a technique that allows the hot swapping of individual hard disk drives and disk arrays from a micro-computer, thus effectively making the hard disk drive or disk array behave more like a removable hard disk or removable disk array.

The second objective of this invention is to devise a technique that allows the hot swapping of individual hard disk drives and disk arrays from a micro-computer wherein the computer-disk drive interface is the industry standard ATA100.

The third objective of this invention is to devise a technique that allows the hot swapping of individual hard disk drives and disk arrays from a microcomputer with secured access.

Other objectives, together with the foregoing are attained in the exercise of the invention pursuant to the following description and resulting in the embodiment illustrated in the accompanying drawings.

DETAILED DESCRIPTION OF PREFERRED EMBODIMENTS

Figure 1A:
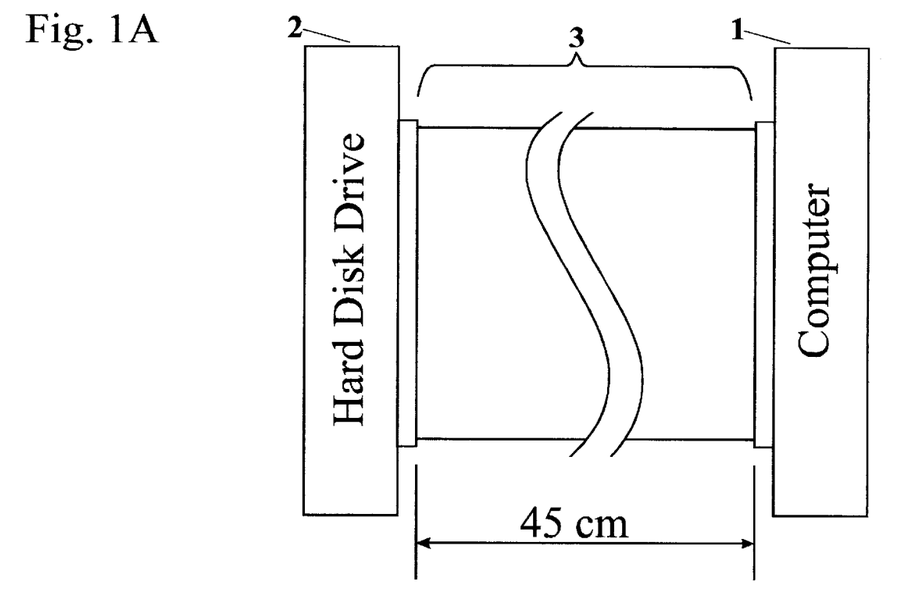
FIG. 1A and FIG. 1B illustrate a system comprising a computer and a disk drive with the industry standard ATA100 interface wherein the insertion of a simple switch is attempted for the purpose of hot swapping.

FIG. 1A illustrates a system comprising a computer and a disk drive with the industry standard ATA100 interface. A Computer 1 is communicatively connected to a Hard Disk Drive 2 with an ATA100 Interface Cable 3 that is an 80 pin flat cable. With a data transfer rate between the Computer 1 and the Hard Disk Drive 2 of 100 MB/s, the frequency of the corresponding data carrier signal of the ATA100 I/F can be up to 50 MHz within a period of Direct Memory Access, or DMA. During the course of signal transfer with such a high frequency, there will be unintended disturbance to the carrier signal due to natural electromagnetic radiation. In fact, this unintended electromagnetic radiation disturbance is the main cause of data transfer error between the Computer 1 and the Hard Disk Drive 2. Another cause of data transfer error is the unintended disturbance to the carrier signal as a result of the coupling of neighboring electromagnetic fields from the parallel signal wires within the ATA100 Interface Cable 3. Nevertheless, regardless of the cause of data transfer error, in general the longer the length of the ATA100 Interface Cable 3 the more the net data transfer error rate will be from these disturbances. Thus, for an acceptable data transfer error rate, the maximum length of the ATA100 Interface Cable 3 has been limited to 45 cm as indicated.

Figure 1B:
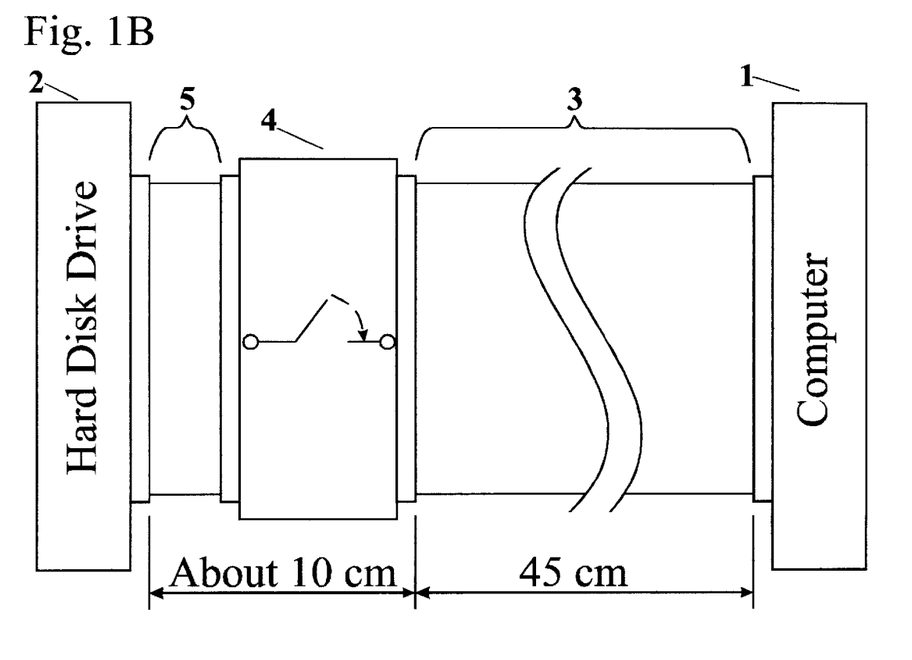

FIG. 1B illustrates a system comprising a computer and a disk drive with the industry standard ATA100 interface wherein the insertion of a simple switch is attempted for the purpose of hot swapping. Notice that, while the ATA100Interface Cable 3 remains the same as in FIG. 1A, a Simple Switch Printed Circuit Board 4 and an associated Cable for Hot swapping 5 must be added. For easy mechanical access, disconnecting and connecting the Hard Disk Drive 2 throughout the swapping operation, a minimum length of about 10 cm is required of the Cable for Hot swapping 5. This means that, with the insertion of a simple switch, the effective length of the interface cable between the Computer 1 and the Hard Disk Drive 2 is increased to about 55 cm, significantly beyond the limit of 45 cm for reliable data transfer. Given the explanation before, the consequence is a degraded and unacceptable data transfer error rate from a combination of excessive signal attenuation, electromagnetic radiation and coupling of electromagnetic fields between neighboring signal wires. In essence, this is why there has not been any simple prior art circuit for the hot swapping of hard disk with an ATA100 interface.

In order to overcome the technical difficulties as explained above, the present invention consists of a number of key electromechanical subsystems. These are a Power Supply Control Circuit, or PSCC; a Logic Control Circuit, or LCC; and a number of Switchable Bi-directional Signal Transmission & Regeneration Circuit, or SBDSTR.

Figure 2A:
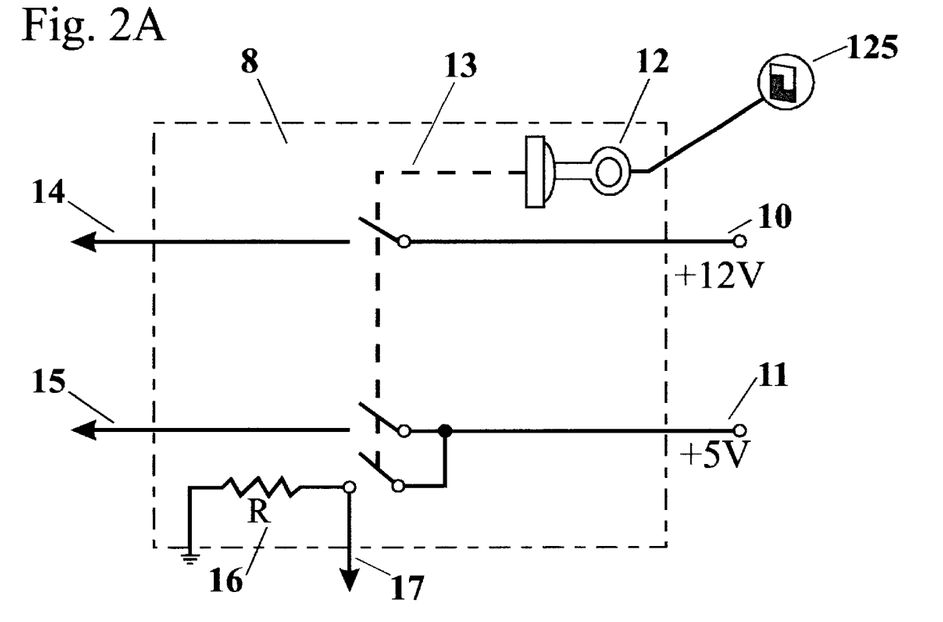
FIG. 2A and FIG. 2B illustrate a Power Supply Control Circuit subsystem and its associated block diagram representation of the present invention for hot swapping.
Figure 2B:
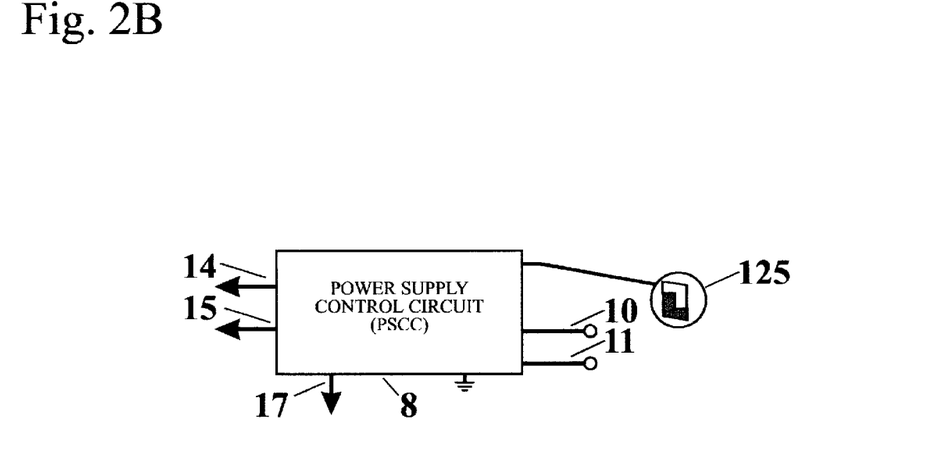

FIG. 2A illustrates the Power Supply Control Circuit 8. From the right hand side, two incoming power supplies +12V Power Supply 10 and +5V Power Supply 11 are switched with a Triple Pole Single Throw, or TPST Switch 13. The TPST Switch 13 is operated through a Security Lock 12. The corresponding switched power supplies on the left hand side are called Key Switched +12V Power Supply 14 and Key Switched +5V Power Supply 15. To avoid any switching related surge of electrical current or arcing, a type of solid state switch should be used for the TPST Switch 13. Additionally, another concurrently switched 5 Volt level logic signal, called Security Logic Signal SW 17, is also generated through an arrangement with a Pull Down Resistor 16. Furthermore, the Security Lock 12 is also shown to simultaneously operate a Mechanical Lock for ATA100 Computer Side Connector 125 between an "Unlocked" state and a "Locked" state. More detailed explanation of the Mechanical Lock for ATA100 Computer Side Connector 125 will be given later. Thus, by tracing the logic implication of each of the two states of "Security Lock Open" and "Security Lock Close" of the Security Lock 12 from FIG. 2A, a functional block diagram representation, as shown in FIG. 2B, of the Power Supply Control Circuit 8 and its associated logic states, as shown in TABLE 1, for the various output power supplies and signals are obtained.

For example, with the "Security Lock 12 open", the TPST Switch 13 is "Open", the Mechanical Lock for ATA100 Computer Side Connector 125 is "Unlocked" and the Security Logic Signal SW 17 is "Logic Low (0)"; and with "Security Lock 12 Close", the TPST Switch 13 is "Close", the Mechanical Lock for ATA100 Computer Side Connector 125 is "Locked" and the Security Logic Signal SW 17 is "Logic High (1)", etc. In addition, for simplicity of expla-nation later, notice the usage of respective graphical symbols to represent the two states of the Mechanical Lock for ATA100 Computer Side Connector 125.

Figure 3A:
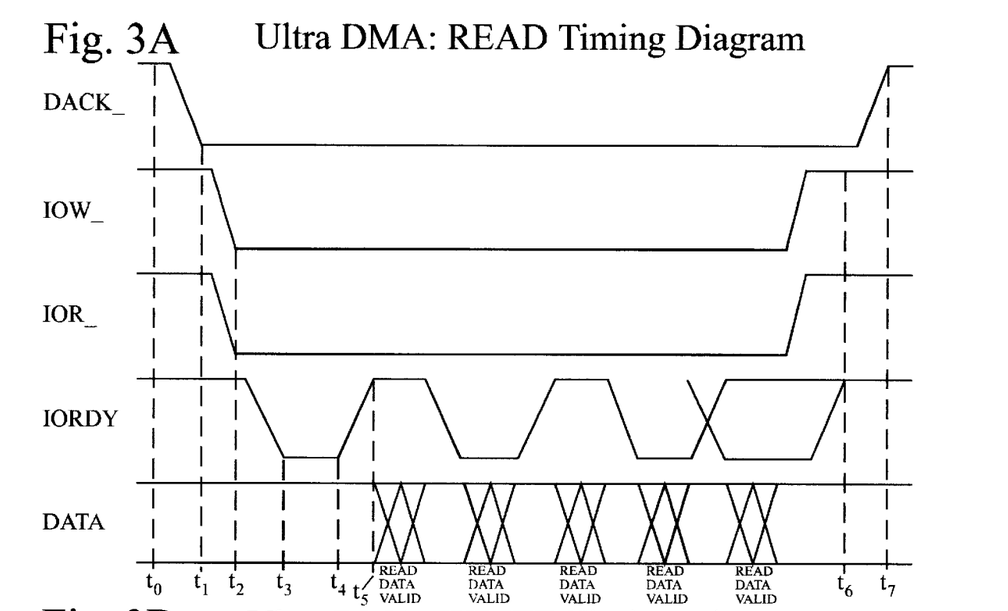
FIG. 3A shows the detailed timing diagram of control signals involved in the READ operation across the ATA100 Interface between a computer and a disk drive.

FIG. 3A shows the detailed timing diagram of control signals involved in the READ operation across the ATA100 Interface between a computer and a disk drive. The control signals are, as defined by the ATA100 Interface, DACK__, IOW__, IOR__ and IORDY. The associated data signal to be read from the Hard Disk Drive 2 by the Computer 1 is DATA. At time $t_0$ all the control signals are high signifying an inactive state of the ATA100 Interface.

TABLE 1

| Action & Output | Security Lock Position | |
|---|---|---|
| | Security Lock Open | Security Lock Close |
| TPST Switch | Open | Close |
| Key Switched +12 V Supply | Not Powered | Powered |
| Key Switched +5 V Supply | Not Powered | Powered |
| Mechanical Lock for ATA100 Computer Side Connector | Unlocked  | Locked  |
| Security Logic Signal SW | Logic Low (0) | Logic High (1) |

At time $t_1$ the signal DACK__ drops to LOW setting the stage for the ATA100 Interface to become active. At time $t_2$ both IOW__ and IOR__ drop to LOW while IORDY stays HIGH. This event transitions the ATA100 Interface into an active READ state. Thus, following the next down transition of IORDY at time $t_3$ and up transition at times $t_4$ and $t_5$, the ATA100 Interface expects a sequence of valid DATA signal from the Hard Disk Drive 2 corresponding to the times while IORDY is HIGH. These time intervals are marked as "READ DATA VALID", etc. afterwards, this READ operation is terminated with an ordered up transition of the signals IOW__, IOR__ and IORDY around time $t_6$. Finally, the ATA100 Interface is returned to its inactive state with the up transition of DACK__ at time $t_7$.

Figure 3B:
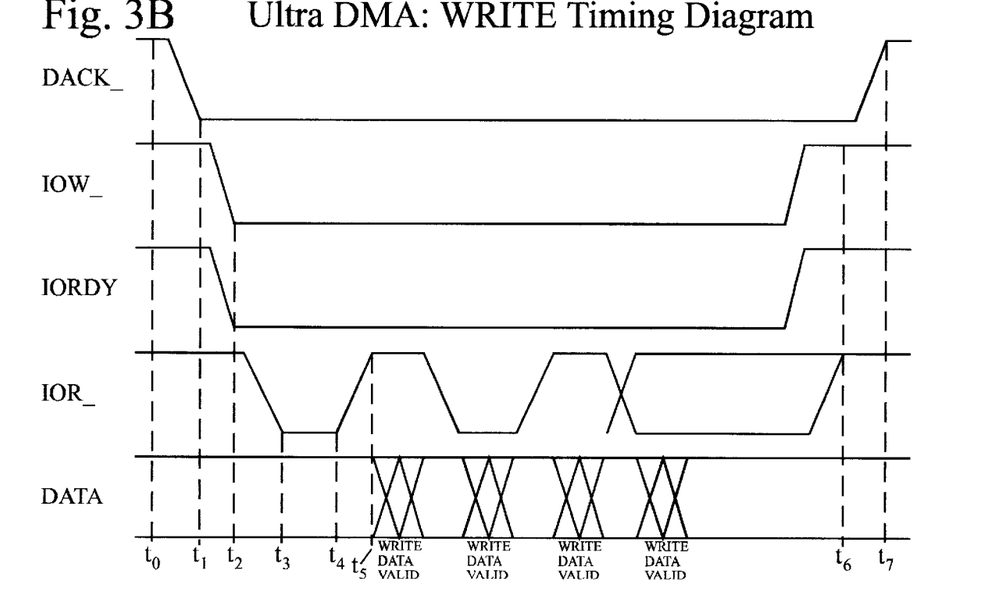
FIG. 3B shows the detailed timing diagram of control signals involved in the WRITE operation across the ATA100 Interface between a computer and a disk drive.

FIG. 3B shows the detailed timing diagram of control signals involved in the WRITE operation across the ATA100 Interface between a computer and a disk drive. Here, except for the reversal of roles between the signals IOR__ and IORDY, the timing sequence is the same as that of the READ operation from FIG. 3A.

Figure 4A:
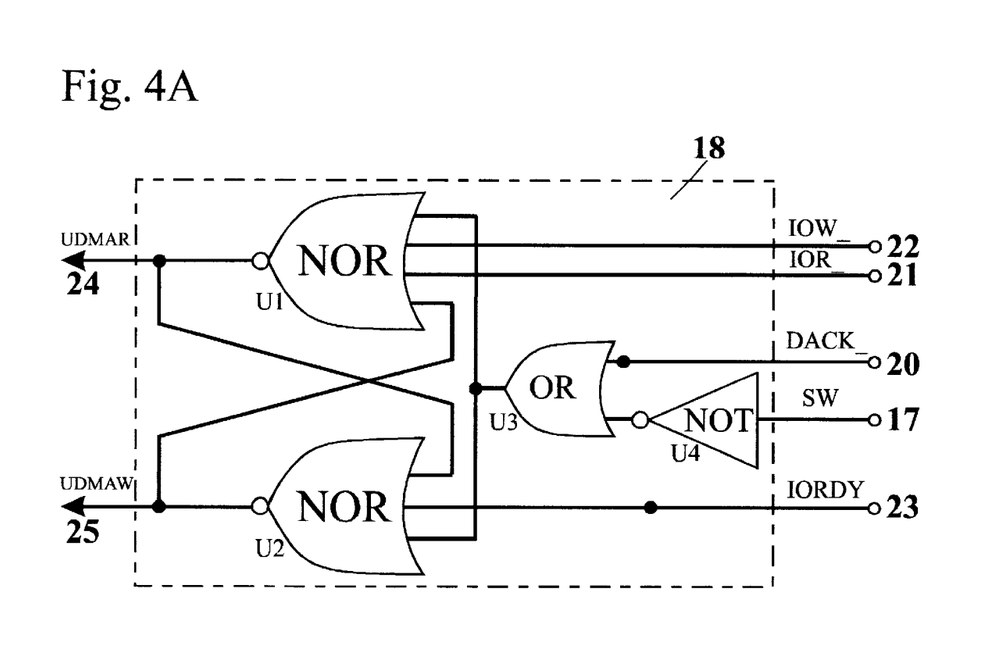
FIG. 4A and FIG. 4B illustrate a Logic Control Circuit subsystem and its associated block diagram representation of the present invention for hot swapping.

Based upon the aforementioned timing diagram of control signals involved in the READ and WRITE operation across the ATA100 Interface between a computer and a disk drive, a Logic Control Circuit 18 is devised and is illustrated in FIG. 4A. The Logic Control Circuit 18 consists of a set of interconnected 4-input NOR Gate U1, a 3-input NOR Gate U2, a OR Gate U3OR Gate U3 and a Inverter U4 with the following input and output signals:

Input:
Security Logic Signal SW 17, Computer Side ATA100 I/F Signal DACK__ 20,
Computer Side ATA100 I/F Signal IOR__21, Computer Side ATA100 I/F Signal IOW__ 22, Computer Side ATA100 I/F Signal IORDY 23
Output:
READ Command Signal UDMAR 24, WRITE Command Signal UDMAW 25

Figure 4B:
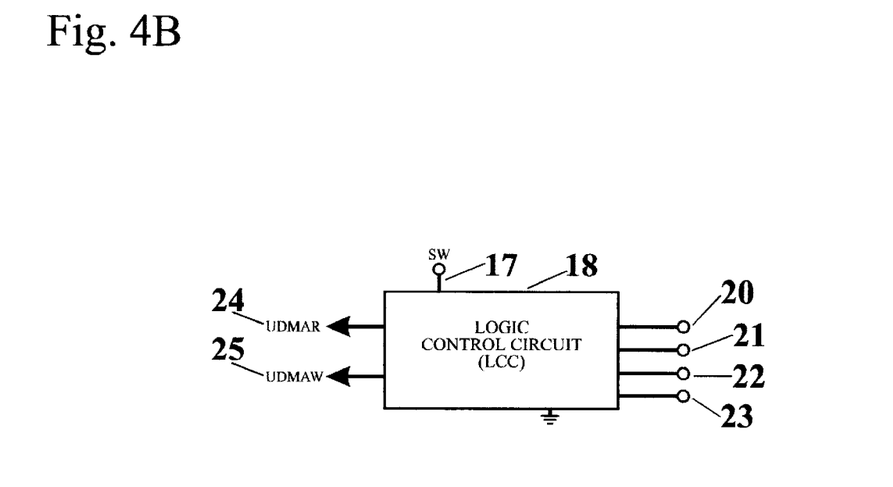

The corresponding functional block diagram representation of Logic Control Circuit 18 is shown in FIG. 4B.

Tracing the logic implication of a number of relevant combination of logic inputs, TABLE 2 is obtained that maps the respective combination of logic inputs to their corresponding output logic states. For example:

Input:

SW=0 (LOW), DACK_=DON'T CARE, IOR_=DON'T CARE, IOW_=DON'T CARE, IORDY=DON'T CARE

Output:

UDMAR=0 (LOW), UDMAW=0 (LOW) as "SW=0" causes the output of Inverter U4 to be "1" and this causes the output of OR Gate U3 to be "1" and this causes the output of both the 4-input NOR Gate U1 and the 3-input NOR Gate U2 to be "0".

For another example:

Input:

SW=1 (HIGH), DACK_=0 (LOW), IOR_=0 (LOW), $IOW_{13}$ =0 (LOW), IORDY=Transition from 0 (LOW) to 1 (HIGH).

Output:

UDMAW=0 (LOW), as "IORDY=Transition from 0 (LOW) to 1 (HIGH)" causes the output of the 3-input NOR Gate U2 to be "0".

UDMAR=1 (HIGH), as "SW=1" causes the output of Inverter U4 to be "0" and this, in combination with DACK_=0, causes the output of OR Gate U3 to be "0". Given that the output of 3-input NOR Gate U2 is "0" from above, the fact that IOW_=0 and IOR_=0 then causes the output of the 4-input NOR Gate U1 to be "1", etc.

TABLE 2

| Logic State | SW | DACK_ | IOR_ | IOW_ | IORDY |
|---|---|---|---|---|---|
| State-I | 0 | X | X | X | X |
| | UDMAR = 0, UDMAW = 0 | | | | |
| State-II | 1 | 1 | X | X | X |
| | UDMAR = 0, UDMAW = 0 | | | | |
| State-III | 1 | 0 | 0 | 0 | ╱ |
| | UDMAR = 1, UDMAW = 0 | | | | |
| State-IV | 1 | 0 | ╱ | 0 | 0 |
| | UDMAR = 0, UDMAW =1 | | | | |

"X" means "DON'T CARE"

Now if one combines the various logic input states from the detailed timing diagram of control signals from FIG. 3A with the functionality of the Logic Control Circuit 18, one would obtain TABLE 3 that maps the various time points in the READ operation across the ATA100 Interface to their corresponding output logic states. For example, at time=$t_0$, the following output state is obtained:

UDMAR=0, UDMAW=0 which means NO READ activity and NO WRITE activity.

However, for another example, at time=$t_5$, the following output state is obtained:

UDMAR=1, UDMAW=0 which means active READ operation but NO WRITE activity, etc.

TABLE 3

GIVEN: SW = 1

| | Logic State | | | | |
|---|---|---|---|---|---|
| Time Point | IOR_ | IOW_ | IORDY | UDMAR | UDMAW |
| $t_0$ | 1 | 1 | 1 | 0 | 0 |
| $t_1$ | 1 | 1 | 1 | 0 | 0 |
| $t_2$ | 0 | 0 | 1 | 1 | 0 |
| $t_3$ | 0 | 0 | 0 | 1 | 0 |
| $t_4$ | 0 | 0 | 0 | 1 | 0 |
| $t_5$ | 0 | 0 | 1 | 1 | 0 |
| $t_6$ | 1 | 1 | 1 | 0 | 0 |
| $t_7$ | 1 | 1 | 1 | 0 | 0 |

Similarly, although not shown, if one combines the various logic input states from the detailed timing diagram of control signals from FIG. 3B with the functionality of the Logic Control Circuit 18, one would obtain another table that maps the various time points in the WRITE operation across the ATA100 Interface to their corresponding output logic states.

Figure 5A:
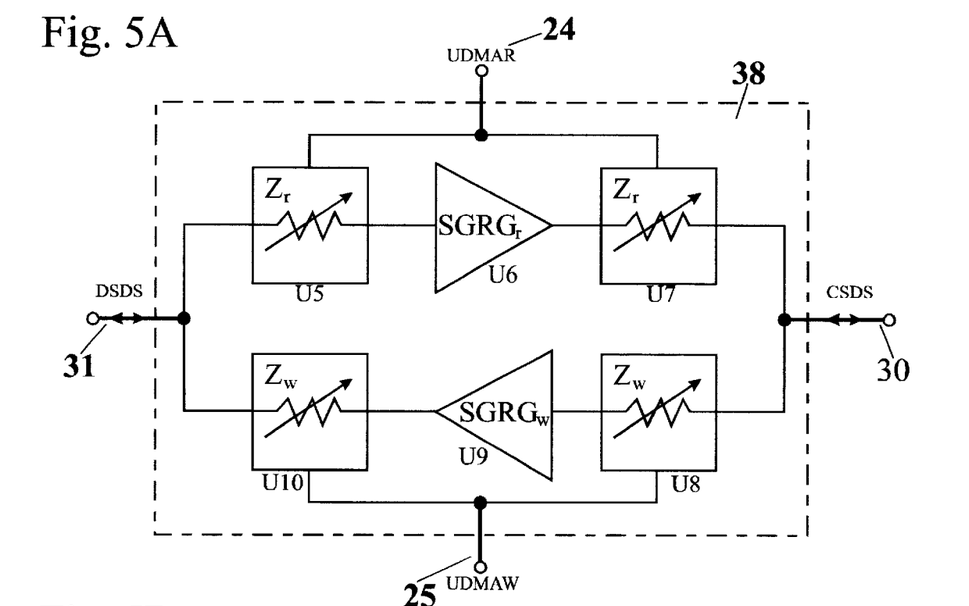
FIG. 5A and FIG. 5B illustrate a Switchable Bi-directional Signal Transmission & Regeneration Circuit subsystem and its associated block diagram representation of the present invention for hot swapping.
Figure 5B:
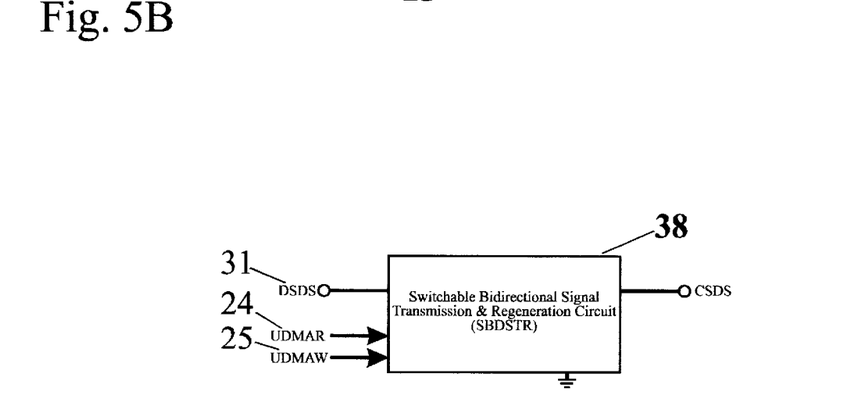

FIG. 5A and FIG. 5B illustrate a SBDSTR subsystem 38 and its associated functional block diagram representation. FIG. 5A shows the detailed circuitry of the SBDSTR subsystem 38 whose logic control inputs are READ Command Signal UDMAR 24 and WRITE Command Signal UDMAW 25. The controlled, bi-directional signals are Computer Side Data Signal 30 and Disk Side Data Signal 31. Functionally, the blocks U5, U7, U8 and U10 are Logic Switchable Impedance symbolized by "$Z_r$". That is:

When input=0, $Z_r$=High Impedance blocking signal transmission through; and

When input=1, $Z_r$=Low Impedance allowing signal transmission through without significant attenuation.

The function of the analog blocks U6 and U9 are Signal Regeneration and Amplification that takes an attenuated input signal, and regenerates and amplifies it to its original unattenuated level.

Combining two logic input states of the READ Command Signal UDMAR 24 and the WRITE Command Signal UDMAW 25 with the described functionality of the SBDSTR subsystem 38, one would obtain another table that maps the logic input states to their corresponding functionality. This is shown as TABLE 4. For example, When READ Command Signal UDMAR 24=1 and WRITE Command Signal UDMAW 25=0, $Z_r$ of both U5 and U7=Low Impedance allowing signal transmission through without significant attenuation; while $Z_r$ of both U8 and U10=High Impedance blocking signal transmission through.

Thus, the Disk Side Data Signal 31 is allowed to be transmitted, with regeneration and amplification by the Signal Regeneration Amplifier U6, from the left hand side to the right hand side of the SBDSTR subsystem 38 to become the Computer Side Data Signal 30 while the reverse transmission of signal, from the right hand side to the left hand side, is completely blocked, etc. The corresponding table of logic and functionality is shown in TABLE 4.

TABLE 4

|  | UDMAR = 1    UDMAW = 0 |
| --- | --- |
| Signal Transmission from CSDS to DSDS | High Impedance with No Signal Transmission |
| Signal Transmission from DSDS to CSDS | Low Impedance with Signal Regeneration |
|  | UDMAR = 0    UDMAW = 1 |
| Signal Transmission from CSDS to DSDS | Low Impedance with Signal Regeneration |
| Signal Transmission from DSDS to CSDS | High Impedance with No Signal Transmission |

Figure 5C:
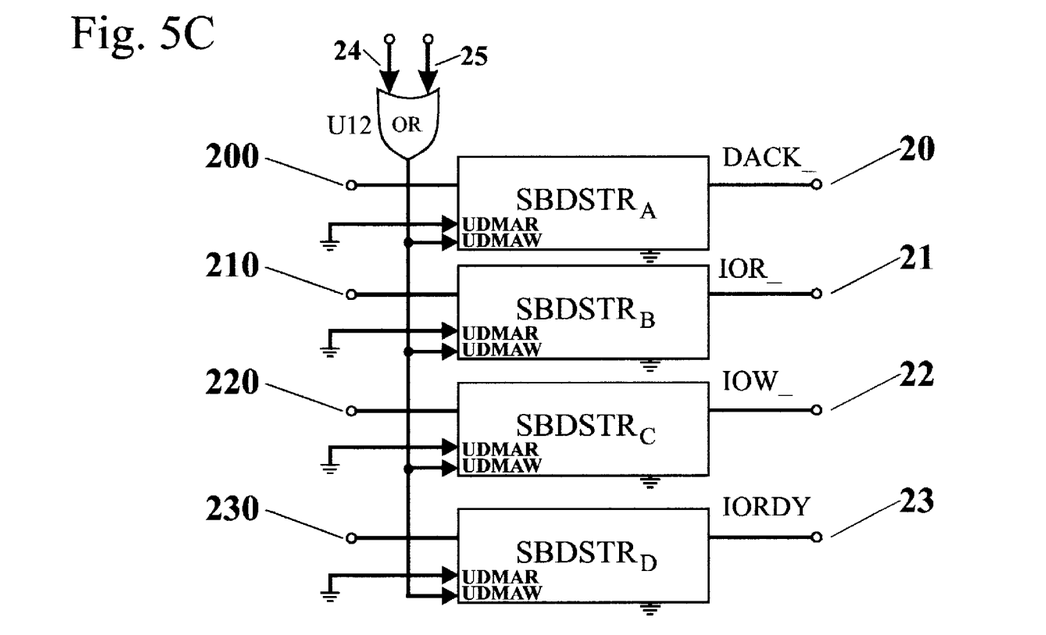
FIG. 5C illustrates the application of the Switchable Bi-directional Signal Transmission & Regeneration Circuit subsystems to the set of control signals involved in the READ and WRITE operation across the ATA100 Interface between a computer and a disk drive.

With the functionality of the SBDSTR understood, FIG. 5C illustrates the application of four (4) of the SBDSTR subsystems to the set of control signals involved in the READ and WRITE operation across the ATA100 Interface between a computer and a disk drive. While the raw logic input signals are common to the four SBDSTR subsystems, namely, READ Command Signal UDMAR 24 and WRITE Command Signal UDMAW 25, the transmission signals under control are all different. They are as follows:

| as illustrated in left hand side of FIG. 5C | as illustrated in right hand side of FIG. 5C |
| --- | --- |
| SBDSTR$_A$ Drive Side ATA100 I/F Signal DACK__200 | Computer Side ATA100 I/F Signal DACK__20 |
| SBDSTR$_B$ Drive Side ATA100 I/F Signal IOR__210 | Computer Side ATA100 I/F Signal IOR__21 |
| SBDSTR$_C$ Drive Side ATA100 I/F Signal IOW__220 | Computer Side ATA100 I/F Signal IOW__22 |
| SBDSTR$_D$ Drive Side ATA100 I/F Signal IORDY 230 | Computer Side ATA100 I/F Signal IORDY 23 |

Figure 5D:
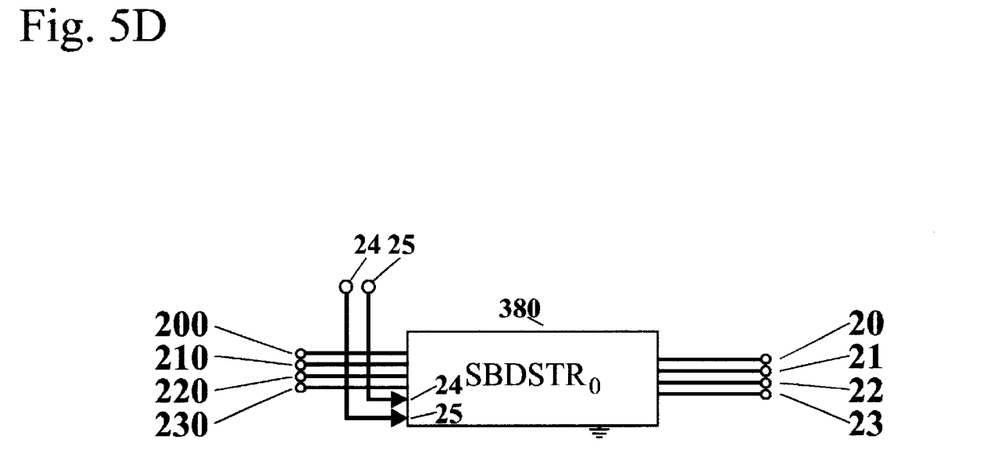
FIG. 5D is the same illustration as shown in FIG. 5C except that the various Switchable Bi-directional Signal Transmission & Regeneration Circuit subsystems from FIG. 5C are condensed into one functional block representation for simplicity.

Additionally, all the "UDMAR" logic inputs to the four SBDSTR subsystems are grounded, or set to logic "0" while all the "UDMAW" logic inputs to the four SBDSTR subsystems are driven by an OR Gate U12 whose inputs are READ Command Signal UDMAR 24 and WRITE Command Signal UDMAW 25. In this way, whenever the logic state needs to be in an active READ or WRITE operation across the ATA100 Interface, that is:

Either (UDMAR=1, UDMAW=0)
Or (UDMAR=0, UDMAW=1), all the above control signals from the "right hand side" will be allowed to pass through to the "left hand side" with low impedance without significant attenuation, as required. To simplify the explanation of the hot swapping system, the various SBDSTR subsystems from FIG. 5C are further condensed into one functional block representation in FIG. 5D, called SBDSTR$_0$ 380.

With all the key subsystems PSCC, LCC and SBDSTR of the present invention described above, FIG. 6A through FIG. 6F illustrate a sequence of progressive overviews of the present invention in a complete environment of system hook up with a computer and a disk drive while going through an entire cycle of hot swapping operation.

Figure 6A:
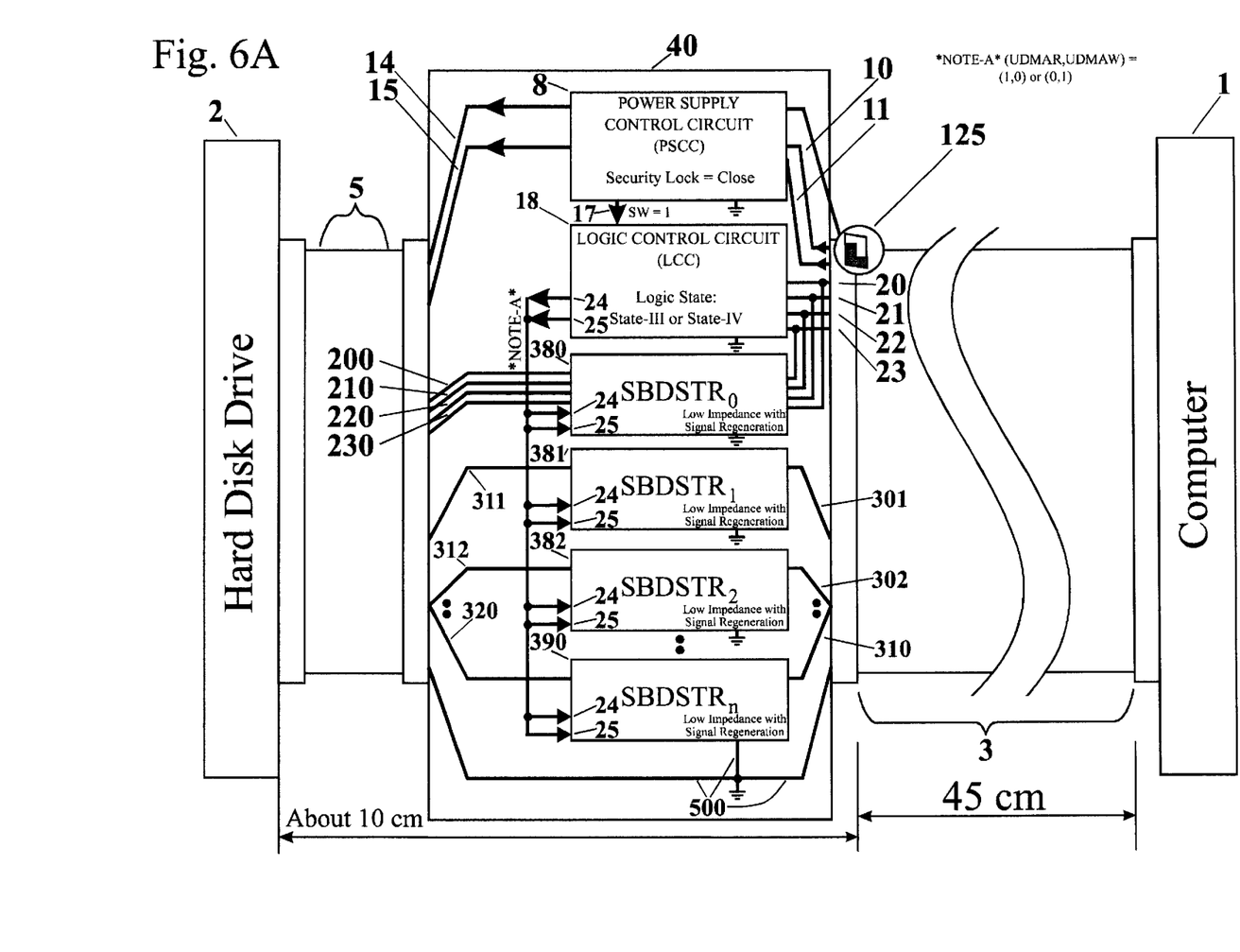
FIG. 6A through FIG. 6F illustrate a sequence of progressive overviews of the present invention in a complete environment of system hook up with a computer and a disk drive while going through an entire cycle of hot swapping operation.

In FIG. 6A, a Hot Swap Printed Circuit Board 40 of the present invention is shown connected to a Hard Disk Drive 2 on the left hand side via a cable for hot swapping 5. On its right hand side, the Hot Swap Printed Circuit Board 40 is connected to a Computer 1 via a ATA100 Interface Cable 3 that is an 80 pin flat cable. For the purpose of hot swapping, it is necessary that the connection between the Hot Swap Printed Circuit Board 40 and the ATA100 Interface Cable 3 be made through a disengageable connector. Furthermore, a Mechanical Lock for ATA100 Computer Side Connector 125 is provided on the Power Supply Control Circuit 8 of the Hot Swap Printed Circuit Board 40. As shown, the Mechanical Lock for ATA100 Computer Side Connector 125 is in its "Locked" position thus preventing the disengagement of the connection between the Hot Swap Printed Circuit Board 40 and the ATA100 Interface Cable 3. The Hot Swap Printed Circuit Board 40 consists of a Power Supply Control Circuit 8, a Logic Control Circuit 18, an SBDSTR$_0$ 380 and a number, "n", of SBDSTR. The SBDSTR are labeled SBDSTR$_1$ 381, SBDSTR$_2$ 382, . . . and SBDSTR$_n$ 390. The number "n" is equal to the total number of data signal wires, as defined by the ATA100 Interface standard, required for the communication between the Computer 1 and the Hard Disk Drive 2. Finally, a set of System Ground Wiring 500 is provided for all the subsystems of the Hot Swap Printed Circuit Board 40 and among the Hot Swap Printed Circuit Board 40, the Hard Disk Drive 2 and the Computer 1. The ATA100 transmission data signals under control are as follows:

| as illustrated at the left hand side FIG. 6A | as illustrated at the right hand side FIG. 6A |
| --- | --- |
| SBDSTR$_1$ DSDS Number One 311 | CSDS Number One 301 |
| SBDSTR$_2$ DSDS Number Two 312 | CSDS Number Two 302 |
| SBDSTR$_n$ DSDS Number n 320 | CSDS Number n 310 |

As before, the logic input signals for all the SBDSTR are the READ Command Signal UDMAR 24 and the WRITE Command Signal UDMAW 25. In turn, the READ Command Signal UDMAR 24 and the WRITE Command Signal UDMAW 25 come from the Logic Control Circuit 18 whose input signal Security Logic Signal SW 17 is driven by the Power Supply Control Circuit 8. As illustrated, the Security Lock of the Power Supply Control Circuit 8 is closed. Furthermore, as indicated by NOTE-A and the Logic State of the Logic Control Circuit 18, State-III or State-IV, the combination of signals Computer Side ATA100 I/F Signal DACK__ 20, Computer Side ATA100 I/F Signal IOR__ 21, Computer Side ATA100 I/F Signal IOW__ 22 and Computer Side ATA100 I/F Signal IORDY 23 puts the Hot Swap Printed Circuit Board 40 in either one of the following states:

(A) READ Command Signal UDMAR 24=1 and WRITE Command Signal UDMAW 25=0, or a READ operation through the ATA100 Interface; or (B) READ Command Signal UDMAR 24=0 and WRITE Command Signal UDMAW 25=1, or a WRITE operation through the ATA100 Interface.

Since the Security Lock of the Power Supply Control Circuit 8 is closed, both the Key Switched +12V Power Supply 14 and the Key Switched +5V Power Supply 15 are powered respectively by the +12V Power Supply 10 and the +5V Power Supply 11 (refer to TABLE 1). In turn, the Key Switched +12V Power Supply 14 and the Key Switched +5V Power Supply 15 would provide the needed power for the Hard Disk Drive 2. Since the Mechanical Lock for ATA100 Computer Side Connector 125 is in its "Locked" position, it would prevent any unauthorized tampering or accidental interruption of the connection between the Computer 1 and the Hard Disk Drive 2 from happening while the system is actively performing its READ or WRITE operation. Otherwise, such tampering or interruption could easily result in loss of data and/or damage to the operating electronic circuitry.

For the purposes of illustration, an example having the following logic state is provided:

(A) READ Command Signal UDMAR 24=1 and WRITE Command Signal UDMAW 25=0, or a READ operation through the ATA100 Interface.

From TABLE 4 it can be seen that all signal transmission from the side of the Hard Disk Drive 2, through an SBDSTR, to the side of the Computer 1 will only encounter low impedance with signal regeneration. Meanwhile, all signal transmission from the side of the Computer 1, through an SBDSTR, to the side of the Hard Disk Drive 2 will encounter high impedance, and thus will be blocked. Furthermore, while the total distance of travel by the respective data signals is, as before, still increased from 45 cm to about 55 cm, the function of signal regeneration by the SBDSTR acts to compensate for the additional signal attenuation and to restore the required quality of the data signals for the full ATA100 Interface data rate of 100 MB/sec.

Applying the reasoning process similar to the above, it should become clear by now that the other example having the alternative logic state:

(B) READ Command Signal UDMAR 24=0 and WRITE Command Signal UDMAW 25=1, or a WRITE operation through the ATA100 Interface.

As illustrated, it will cause all signal transmission from the side of the Computer 1, through an SBDSTR, to the side of the Hard Disk Drive 2 to only encounter low impedance with signal regeneration thus also capable of operating at the full ATA100 Interface data rate of 100 MB/sec.

Figure 6B:
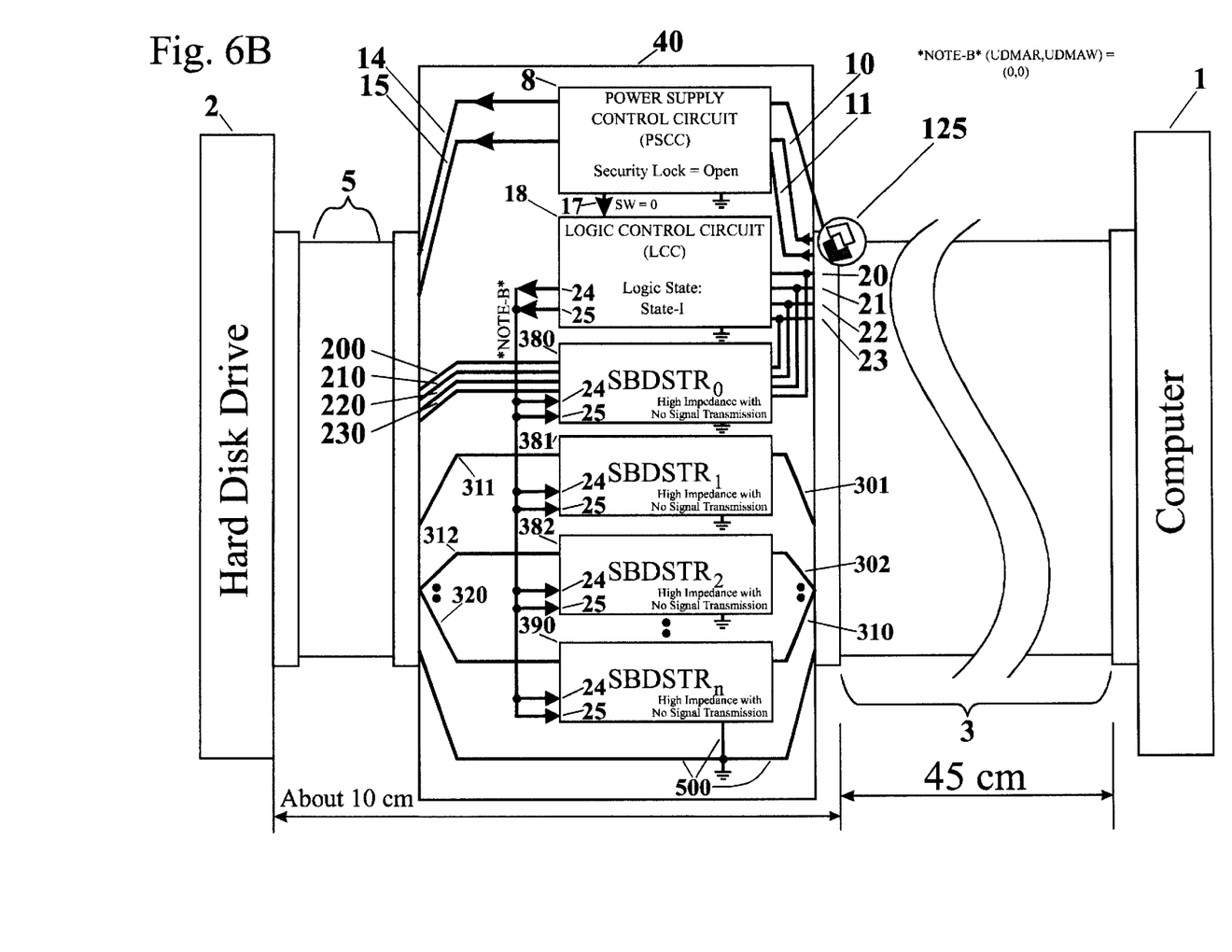

Next, FIG. 6B illustrates the present invention wherein the Security Lock is opened up, for example, by an authorized operator, in preparation for a hot swapping operation. Both the Key Switched +12V Power Supply 14 and the Key Switched +5V Power Supply 15 are now switched into a "Not Powered" state accordingly to TABLE 1. This is important for the safeguard of the system. Otherwise a subsequent act of disconnection could cause the flow of an instantaneous interfering current or an arcing through the power supplies thus damaging the electronic hardware and/or software of the system. Also, the Security Logic Signal SW 17 is reset to Logic Low (0) per TABLE 1. This causes, per TABLE 2 for Logic Control Circuit 18, the following to happen:

READ Command Signal UDMAR 24=0 and

WRITE Command Signal UDMAW 25=0.

In turn, the above switches all the SBDSTR into the following state (TABLE 4):

SBDSTR$_0$ 380: High Impedance with No Signal Transmission

SBDSTR$_1$ 381: High Impedance with No Signal Transmission

SBDSTR$_2$ 382: High Impedance with No Signal Transmission SBDSTR$_n$ 390: High Impedance with No Signal Transmission In essence, all of the right hand signals:

Computer Side ATA100 I/F Signal DACK_ 20,

Computer Side ATA100 I/F Signal IOR_ 21,

Computer Side ATA100 I/F Signal IOW_ 22,

Computer Side ATA100 I/F Signal IORDY 23,

CSDS Number One 301,

CSDS Number Two 302, and

CSDS Number n 310 are electrically isolated from their corresponding left hand signals:

Drive Side ATA100 I/F Signal DACK_ 200,

Drive Side ATA100 I/F Signal IOR_ 210,

Drive Side ATA100 I/F Signal IOW_ 220,

Drive Side ATA100 I/F Signal IORDY 230,

DSDS Number One 311,

DSDS Number Two 312, and

DSDS Number n 320.

Figure 6C:
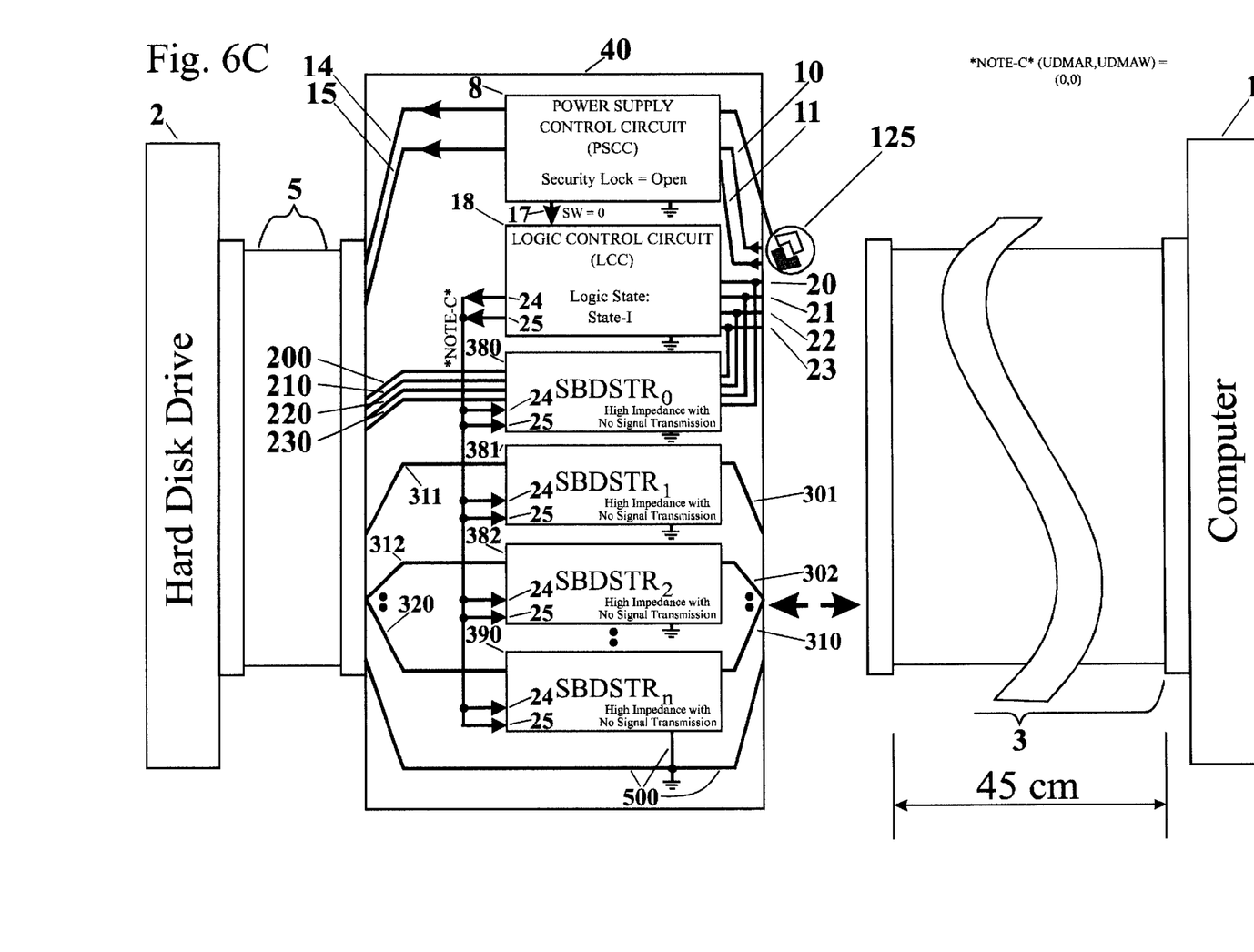

This is also important for the safeguard of the system. Otherwise a subsequent act of disconnection could cause the flow of an instantaneous interfering current or an arcing through the respective signal paths thus damaging the electronic hardware and/or software of the system. At this time, the Mechanical Lock for ATA100 Computer Side Connector 125 is also "Unlocked" (TABLE 1) allowing safe physical disconnection of the Hard Disk Drive 2 from the Computer 1. This action is illustrated in FIG. 6C with a set of two thick, horizontal arrows separating the group of:

Hard Disk Drive 2, Cable for Hot swapping 5 and Hot Swap Printed Circuit Board 40

From the group of:

Computer 1 and ATA100 Interface Cable 3. Notice the graphically symbolized "Unlocked" state of the Mechanical Lock for ATA100 Computer Side Connector 125.

Figure 6D:
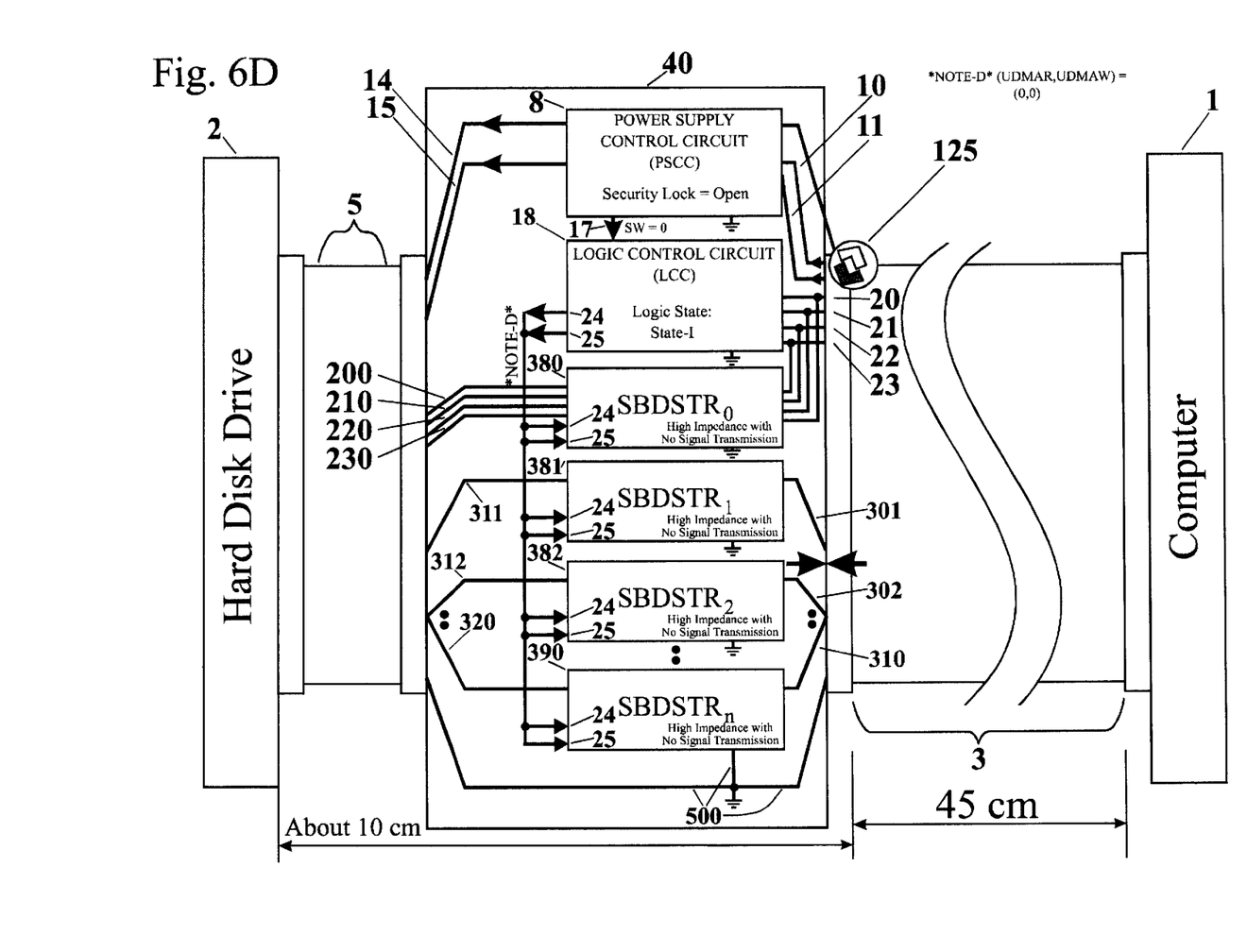

FIG. 6D illustrates the first step of reconnection of the above two groups with another set of two thick, horizontal arrows. Notice again the graphically symbolized "Unlocked" state of the Mechanical Lock for ATA100 Computer Side Connector 125 and the state of Security Lock 12=Open. As all the switched power supplies, control and data signals are still either "Not Powered" or "totally isolated between the left hand side and the right hand side", the act of reconnection is guaranteed to be free of any risk of system damage.

Figure 6E:
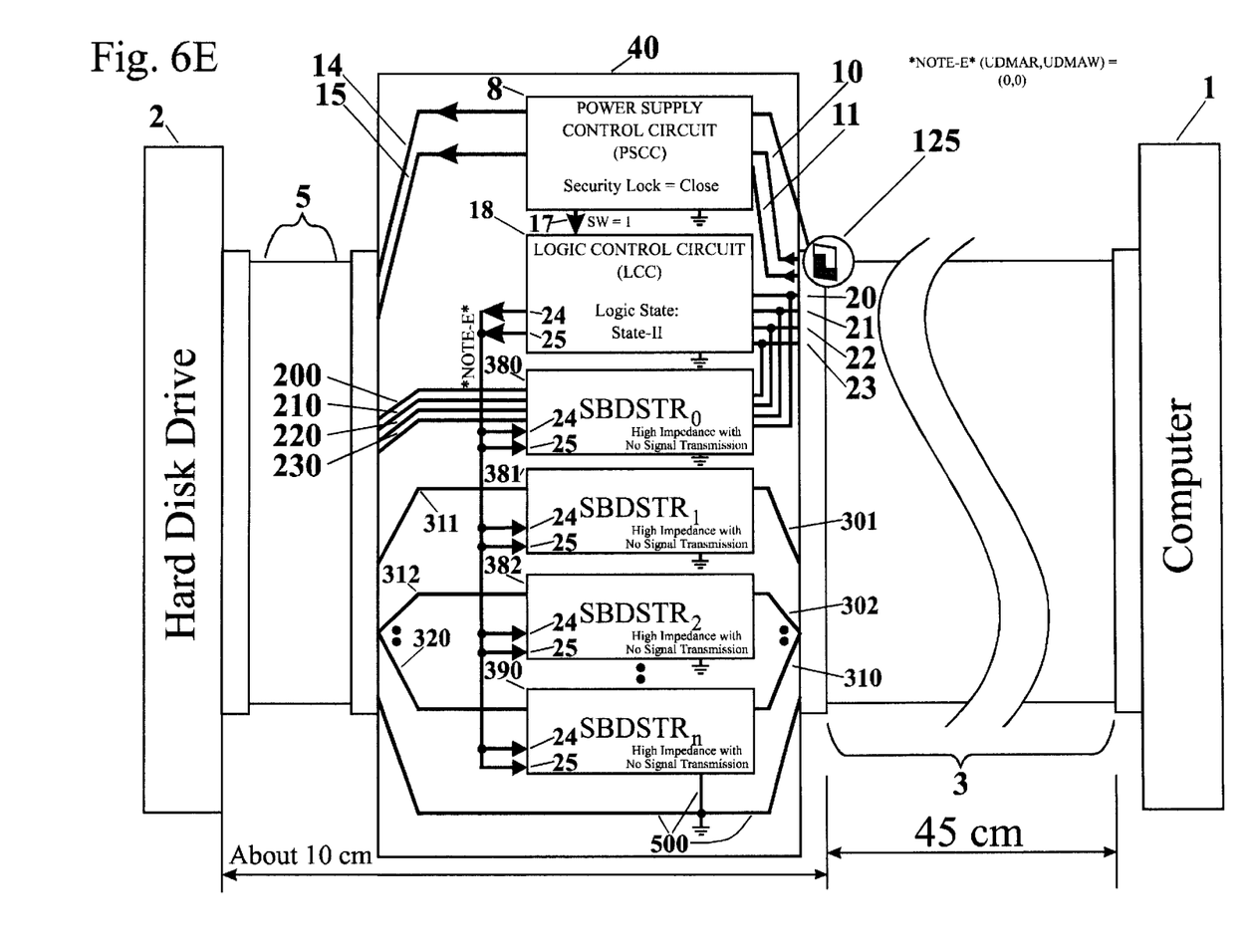

FIG. 6E illustrates the second step of reconnection of the above two groups wherein the Security Lock of the Power Supply Control Circuit 8 is "Closed", for example, by an authorized operator. Simultaneously, the Security Logic Signal SW 17 is set to Logic High (1) and the Mechanical Lock for ATA100 Computer Side Connector 125 is switched into its "Locked" position as graphically symbolized. Thus, the Key Switched +12V Power Supply 14 and the Key Switched +5V Power Supply 15 are now "powered" (TABLE 1) under the protection of the "Locked" Mechanical Lock for ATA100 Computer Side Connector 125. Furthermore, the logic state of the Logic Control Circuit 18 is switched into State-II (TABLE 2), ready to be further switched into its subsequent normal operating states.

Figure 6F:
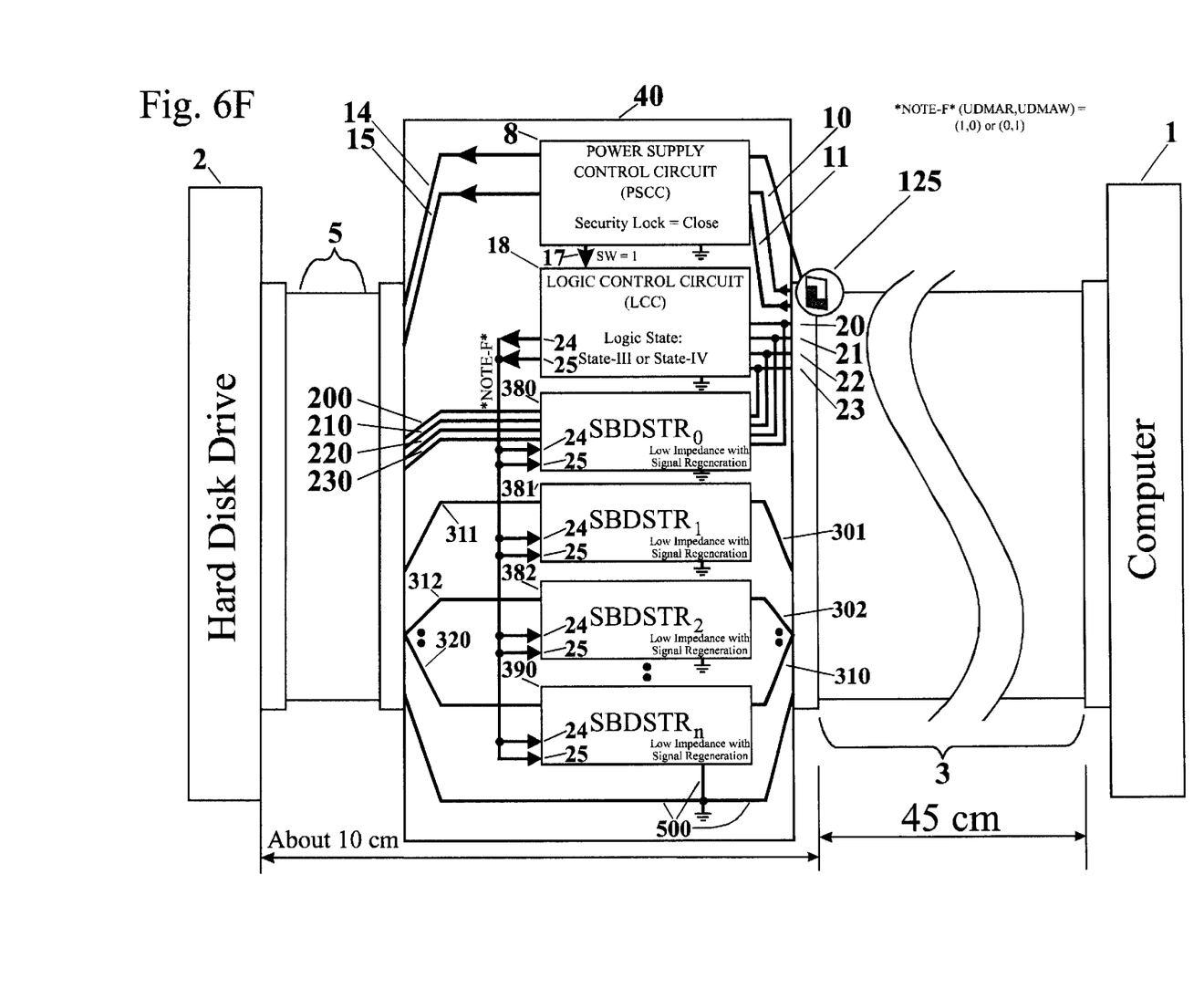

FIG. 6F illustrates the third step of reconnection of the above two groups wherein the ATA100 Interface is switched back to its normal operating state of READ or WRITE by the proper timing of the following control signals:

Computer Side ATA100 I/F Signal DACK_ 20,

Computer Side ATA100 I/F Signal IOR_ 21,

Computer Side ATA100 I/F Signal IOW_ 22, and

Computer Side ATA100 I/F Signal IORDY 23 (State-III or State-IV of TABLE 2, [$t_2$, $t_3$, $t_4$, $t_5$] of TABLE 3).

Notice that, except for some minor differences in labeling, all the functional characteristics of FIG. 6F are identical to those of FIG. 6A. An important remark related to the employment of a manually operated Security Lock 12 (FIG. 2A) by the Hot Swap Printed Circuit Board 40 is that it satisfies the requirements of disk array RAID 1, an industry standard which defines mirroring operation of hard disk drives. Specifically, in the course of mirroring operation of two hard disk drives, the operating computer software and the startup of any special software for the hard disk drive are not allowed to stop running. In fact, in this case, only the startup by a manual switch is allowed to effect the manipulation of hot swapping of hard disk drives.

Therefore, the illustrated embodiments of the present invention function to insure a safe and secured hot swapping system of data communication between a Computer and a Hard Disk Drive while maintaining the full ATA100 Interface data rate of 100 MB/sec and satisfying the requirements of the RAID industry standard for disk array. The invention has been described using exemplary preferred embodiments. However, for those skilled in the art, the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

I claim:

1. A hot swap circuit board adaptable for a computer-disk drive interface of a computer-disk drive system, comprising:
   a key-switched power supply control circuit to provide power supply and a security logic signal,
   a set of logic switchable impedance circuits to provide a set of computer-supplied control signals;
   a logic control circuit to provide a READ command signal and a WRITE command signal in response to the security logic signal and the set of computer-supplied control signals; and
   a number of logic switchable bi-directional impedance circuits corresponding to a number of data signals defined in the computer-disk drive interface;
   whereby the hot swap circuit board performs a function of safe hot swapping of a disk drive attached to the computer-disk drive interface without having to cycle the power of the computer-disk drive system while satisfying a requirement of disk mirroring operation wherein an operating computer software can not be interrupted and no special software can be started.

2. The hot swap circuit board according to claim 1 wherein the set of logic switchable impedance circuits further comprises a signal regeneration amplifier.

3. The hot swap circuit board according to claim 2 wherein the computer-disk drive interface further comprises a signal regeneration amplifier.

4. The hot swap circuit board according to claim 3 wherein the computer-disk drive system further comprises a cable with an increased effective total cable length connecting thereof to maintain a specified data rate of the computer-disk drive interface.

5. The hot swap circuit board according to claim 4 wherein the hot swap circuit board further comprises a mixed signal application circuit for its circuitry to provide an additional advantage of reduction in cost, product size and power consumption.

6. The hot swap circuit board according to claim 1 wherein the key-switched power supply control circuit is a key-switched +12V power supply or a key-switched +5V power supply.

7. The hot swap circuit board according to claim 1 wherein the computer-disk drive interface is an ATA 100 interface.

8. The hot swap circuit board according to claim 1 further comprises a security lock on the hot swap circuit board so as to prevent any accidental disconnection of the connector for the computer-disk drive interface while simultaneously supplying electrical power and transmitting signals across the computer-disk drive interface for normal operation.

9. A hot swap circuit board adaptable for performing a function of safe hot swapping of a disk drive attached to an electrical interface between two electronic system, comprising:
   a key-switched power supply control circuit to provide power supply and a security logic signal;
   a set of logic switchable impedance circuits to provide a set of control signals supplied by the first electronic system;
   a logic control circuit to provide a READ command signal and a WRITE command signal in response to the security logic signal and the set of control signals supplied by the first electronic system; and
   a number of logic switchable bi-directional impedance circuits corresponding to a number of data signals defined in the electric interface;
   whereby the function of safe hot swapping of the disk drive is performed without having to cycle the power of the second electronic system while satisfying a requirement of disk mirroring operation so as not to interrupt any functions then in operation by the first electronic system.

10. A method for safe hot swapping of a disk drive attached to a disk drive interface without having to cycle the power of a computer-disk drive system while maintaining a specified data rate of the computer-disk drive interface across an increased effective total cable length between the computer and the disk drive, comprising:
   providing a hot swap circuit board to the computer;
   providing a security lock on the hot swap circuit board in its locked position so as to prevent any accidental disconnection of the disk drive interface while simultaneously supplying electrical power and transmitted and regenerated control signals and data signals across the disk drive interface for normal operation;
   unlocking the security lock on the hot swap circuit board so as to enable a future disconnection of the disk drive interface while simultaneously switching off the supply of electrical power and cutting off the transmission and the regeneration of control signals and data signals across the disk drive interface thus enabling the disconnection of the disk drive interface;
   removing the disconnected disk drive interface and replacing it with a new disk drive; and
   locking the security lock on the hot swap circuit board for the new disk drive so as to prevent any accidental disconnection of the disk drive interface while simultaneously resuming the supply of electrical power and the transmission and the regeneration of control signals and data signals across the disk drive interface for a resumed normal operation.

11. The method for safe hot swapping of a disk drive according to claim 10 wherein the hot swap circuit board further comprises a key-switched power supply control circuit to provide power supply and a security logic signal.

12. The method for safe hot swapping of a disk drive according to claim 10 wherein the hot swap circuit board further comprises a set of logic switchable impedance circuits to provide a set of computer-supplied control signals.

13. The method for safe hot swapping of a disk drive according to claim 10 wherein the hot swap circuit board further comprises a logic control circuit to provide a READ command signal and a WRITE command signal in response to the security logic signal and the set of computer-supplied control signals.

14. The method for safe hot swapping of a disk drive according to claim 10 wherein the hot swap circuit board further comprises a number of logic switchable bi-directional impedance circuits corresponding to a number of data signals defined in the disk drive interface.

15. The method for safe hot swapping of a disk drive according to claim 10 wherein the disk drive interface is an ATA 100 interface.

* * * * *